Patented Dec. 21, 1937

2,103,012

UNITED STATES PATENT OFFICE 2,103,012

CELLULOSE ESTERS

Richard Müller, Mannheim-Neuostheim, Martin Schenck, Mannheim, and Wilhelm Wirbatz, Mannheim-Waldhof, Germany, assignors to C. F. Boehringer & Soehne G. m. b. H., Mannheim-Waldhof, Germany No Drawing. Application March 19, 1932, Serial No. 600,060. In Germany March 24, 1931

18 Claims. (Cl. 260—101)

The present invention relates to the production of cellulose esters and has for its purpose to provide means whereby such esters can be produced in a particularly useful and efficient manner.

The method forming the subject matter of this invention consists of a combination of steps, some of which have already been suggested before in the treatment of cellulose, but which were never before combined in a single process. It has been found that it is due to the combination of steps to be described more fully hereinafter, that not only cellulose derivatives can be produced in a particularly advantageous manner, but that products can be obtained, which possess particularly valuable and partly hitherto unknown properties.

The method according to the present invention consists therein that, in the production of cellulose esters by means of the corresponding acid anhydrids acting as esterification or acylating agents, perchloric catalysts, that is perchloric acid and perchloric acid compounds are used, which have already been suggested for use as catalysts in this reaction, for instance in our U. S. Patent 2,045,161. However, contrary to the method hitherto followed, these catalysts are used in combination with sulfur dioxide, the reaction mixture being intimately mixed and special conditions of operation being followed as far as the temperature is concerned. For we have found that care must be taken not only to prevent undesirable rises of temperature in the reacting mass as a whole to arise, but also local differences of temperature within the reaction mixture.

If the production of the esters is carried out in this manner, the final products are obtained also at low temperature and with a smaller quantity of the catalyst than was hitherto considered necessary, or the reaction comes to an end in less time. In any case the products thus obtained are of a particularly high quality and partly possess entirely new properties. It is thus possible for instance to produce cellulose acetates which show a content of acetic acid such as would correspond to a tri-acetate and which are free from traces of the catalyst and therefore extraordinarily stable, turning only slightly yellow even when heated to about 250–270° C., being storable without showing any changes and yielding solutions in methylene chloride with or without the addition of some alcohol, which are limpid, although possessing an extremely high viscosity. These cellulose acetates can be formed into products, such as films, threads, etc., the mechanical properties of which are far superior to those of primary cellulose acetates produced in the hitherto known manner.

Thus films prepared from cellulose tri-acetates obtained according to the present invention and having a thickness of 0.1 mm. and a width of 15 mms., when tested in the testing apparatus in general use invented by Schopper, show a tensile strength of 19 kgs., an elongation of about 18–20% and a bending coefficient of 180–200.

If one of the conditions enumerated above has not been observed, for instance if the sulfur dioxide is replaced in the production of the cellulose tri-acetates by acetic acid, which is mostly present in the acetylating mixture, films are obtained which at even thickness and width, when tested with the same apparatus, show a tensile strength of about 19 kgs., a maximum elor ation of 12–14% and a bending coefficient of about 70–90.

If the perchloric acid catalysts are replaced by sulfuric acid, which is mostly used for esterification, non-stable primary acetates are formed, which assume a deep brown color already at about 220° C.

In an analogous manner a deviation from the conditions of temperature, both general and local, will exert an unfavorable influence inasmuch as the acetylation products will not be uniform in character.

Therefore, in order to obtain high-grade products, such as can be obtained according to the present invention, it is not sufficient to observe one or the other condition, i. e. to take one or the other step of the combination, while replacing others by some well known mode of operation, but it is necessary that all the members of the combination, i. e. simultaneous use of perchloric acid catalysts and sulfur dioxide and the maintenance of moderate and quite especially uniform temperatures are used in combination.

When speaking of perchloric acid catalysts we do not limit ourselves to the perchloric acid itself, but wish to include also its salts of every kind including the alkali metal salts. When using the alkali metal salts of perchloric acid as catalysts, we add a mineral acid. When using other perchlorates, such as the perchlorate of zinc or magnesia, an acid may also be added, however, in this case such addition is not necessary. If perchloric acid itself is used as a catalyst in the present process, 0.1 part by weight of perchloric acid and even less will prove sufficient, at a reaction temperature of about 40° C., for esterifying 100 parts cellulose; if operating at 15° C. 0.2–0.4 part will be required. Of the salts of perchloric acid somewhat greater quantities must be used, for instance in the case of perchlorate of zinc 3% of the weight of the cellulose, provided that the reaction is carried through at 25° C.

In preparing the acetylating liquid, the sulfur dioxide can be admixed with the acetylating agent, consisting of acetic anhydrid with or without acetic acid or other additional substances, in the form of a liquid or it may be introduced in gaseous form, preferably under cooling. In both cases the same acetylating mixture is obtained.

As a rule we prefer using quantities of sulfur dioxide which at least correspond to the weight of the cellulose. We can carry through the reaction under pressure with sulfur dioxide in excess, but we may also use only such a quantity of sulfur dioxide, that the solution is merely or not saturated with sulfur dioxide, when producing the mixture and also during reaction. If during the reaction a rise of temperature and consequent overstepping of the saturation limit generates pressure, part of the sulfur dioxide may be allowed to escape, and the heat of evaporation of the sulfur dioxide may be utilized as shown more fully hereinafter.

We have found that it is generally advantageous not to overstep temperatures of 40–50° C. during the reaction and to take care that the reaction starts at a lower temperature. If the reaction is started at about 10–15° C. sufficient time will be left for a thorough moistening and mixing of the cellulose with the acetylating liquid before the reaction, which occurs under generation of heat, is appreciably started. One can maintain moderate temperatures uniformly in all zones by operating with the usual cooling means supplied with cooling liquids etc., the mixture being at the same time vigorously mixed by mechanical means. This mode of cooling can be effectfully assisted or may even be replaced by a partial evaporation of the sulfur dioxide according to the disclosure in the specification of U. S. Patent No. 1,910,176, the undesirable heat being extracted from the reaction mixture by the escaping SO₂. By lowering the quantity of catalyst present we may also control and regulate the reaction velocity and in consequence thereof also the rise of temperature within the reaction mass.

Similarly as for the acetylation of the cellulose the present invention also lends itself to the production of other and of mixed cellulose esters. Esters of a higher order are obtained by the combination of steps above described if acetic anhydrid is replaced by the corresponding acid anhydrid, the acetic acid which may be present as a diluent in the acetylating mixture being, if desired, replaced by the corresponding acid. If mixed esters shall be produced either 2 or more anhydrids may be made to act simultaneously on the cellulose or the anhydrids may be partly replaced by the corresponding acids.

We have found it advantageous, although not always necessary, to subject the cellulose before esterification to a preliminary treatment by means of acids, for instance by placing it in a well known manner in acetic acid. We may add sulfur dioxide to this acid and we may even add to it part or the whole of the catalyst required for esterification. If such preliminary treatment is adopted with acids capable of exerting an esterifying action on the cellulose, such as nitric acid or formic acid, there are obtained, if esterification proper is effected with the anhydrids of other acids in the normal manner, mixed esters.

If adding to the esterification mixture a substance or substances capable of preventing dissolution of the esterification products, we obtain fibriform cellulose esters which can be washed out in a particularly simple manner. We then obtain the advantage that the esterification liquids, being readily separated from the esterification products by mechanical methods such as centrifuging, can be regenerated very easily. As substances which prevent the cellulose esters from dissolving during the reaction, all compounds hitherto suggested for this purpose may be used, provided that they are capable of mixing homogeneously with the esterification agent and the sulfur dioxide. Benzene, toluene, exylene, petrol, ligroin, carbon tetrachloride, cyclohexanol acetate, ethyl acetate etc. and also mixtures of these substances can for instance be added.

The primary cellulose esters obtainable according to the present invention can be used at once, i. e. without conversion into an intermediate product of a different degree of solubility and with or without the addition of jelly-forming or softening agents, coloring matter etc. for producing threads, films, foliae, plastic masses, lacquers, insulating materials etc., being particularly adapted therefor in view of the extraordinary stability, which remains unchanged also after prolonged storing, their good mechanical properties, their resistivity against water and their high insulating capacity. They, however, also form a high-grade starting material for cellulose esters of different solubility and for the so-called secondary cellulose esters. They can preferably be converted into these kinds of compounds in a well known manner by acting thereon with acids. If fibriform primary cellulose acetates obtained in accordance with the present invention shall be converted into secondary acetates without losing their fibriform structure, we prefer operating in the presence of substances capable of counteracting the dissolving action of the strong acids used in this conversion, as disclosed in our U. S. Patent 2,002,674.

With dilute acids the cellulose tri-acetates produced according to the present invention cannot be converted into products soluble in acetone. This inability is characteristic of the primary acetates obtained according to the present invention. These primary acetates do not dissolve in cold glacial acetic acid either.

As described above, the process according to the present invention results in products which form limpid solutions already at an unusually high degree of viscosity. Obviously, however, by suitably raising the temperature during esterification, by prolongating the time of reaction or by similar steps products can be obtained which correspond as to viscosity to any desired lower viscosity stage including the viscosity of the known cellulose acetates.

In practising our invention we may for instance proceed as follows:—

Example 1

100 parts by weight cotton linters are soaked in 1000 parts glacial acetic acid and centrifuged after the lapse of 4 hours. The material thus treated is now subjected to acetylation with a mixture composed of 375 parts acetic anhydrid of 91%, 540 parts toluene, 380 parts sulfur dioxide and 0.44 part perchloric acid of 70% under thorough mixing. We prefer preparing the mixture by introducing into it sulfur dioxide gas, until 380 parts have been absorbed. We may, however, also add the sulfur dioxide in form of a liquid. The mixture is cooled to prevent the temperature from rising during the reaction above about 25° C. This may be effected for instance by using the method disclosed in the specification of U. S. Patent No. 1,910,176, by causing the extraction of undesirable heat from the reaction mixture by the volatilization of the $SO_2$. We may, however, also cool with cooling agents under vigorous stirring. After the lapse of about 8–10 hours the mixture is centrifuged, preferably after having neutralized the perchloric acid with sodium acetate. The reaction product is rinsed and dried.

The woolly product, a cellulose tri-acetate containing about 62.5% acetic acid, is extraordinarily stable. On the dry product being heated, a slight yellow tint occurs only at about 250–270° C. The product is not dissolved in acetone or cold glacial acetic acid, but it dissolves clearly in methylene chloride or in a mixture of methylene chloride and alcohol. A solution of 6 grams in 100 ccm. of a mixture composed of 90 parts by volume methylene chloride and 10 parts by volume alcohol shows at 25° C. a viscosity of 350 seconds, as compared with the viscosity of glycerine (100%), which in the same apparatus shows an outflow period of 153 seconds (see British Engineering Standard's Association D. 50 of March 1923).

Films prepared from solutions of this kind are extremely resistive to water and do not shrink in drying. In Schopper's testing apparatus, which is in general use for this kind of measurements, films prepared from these solutions and being 0.1 mm. thick, display a tearing strength of 18–19 kgs., an elongation of 18–20% and a bending coefficient of 180–200. If the same films are tested anew after several months' storing, the same figures are obtained.

We can produce analogous cellulose tri-acetates if we replace the free perchloric acid by about 3 parts perchlorate of zinc of 5–6 parts perchlorate of magnesia. We may, however, also use as catalysts 4 parts perchlorate of sodium or 3–5 parts perchlorate of lithium in conjunction with 3–5 parts phosphoric acid.

*Example 2*

100 parts cotton containing about 8% water are entered without any preparation in a mixture composed of 420 parts acetic anhydrid of 91%, 1000 parts methylene chloride, 350 parts sulfur dioxide and 0.5 part perchloric acid of 70%. After vigorous mixing and partial evaporation of the $SO_2$ in accordance with the method above described the temperature is allowed to rise slowly to about 25° C. After the lapse of about 15 hours a limpid solution has been formed and acetylation has come to an end and the cellulose acetate is precipitated in a well known manner, washed to remove all the acid and dried.

*Example 3*

100 parts cellulose are subjected to preliminary treatment with glacial acetic acid in accordance with Example 1 and are thereafter subjected to acetylation in a closed vessel with a mixture composed of 420 parts acetic anhydrid (91%), 2400 parts sulfur dioxide and 0.5 part perchloric acid (70%), care being taken, by vigorous cooling with cooling agents, to maintain a temperature of about 20–25° C. After the lapse of about 5 hours the acetylation has come to an end and the cellulose tri-acetate is precipitated with water, washed and dried.

*Example 4*

Into a mixture composed of 420 parts acetic anhydrid (90%) and 630 parts cyclohexanol acetate, 420 parts sulfur dioxide gas are introduced under cooling. We now add 6 parts perchlorate of zinc and introduce the mixture cooled down to about 10° C. into an autoclave containing 100 parts cotton linters pretreated in accordance with Example 1. The acetylation is now carried through at about 25° C. under pressure, the mixture being well mixed and cooled. It comes to an end after the lapse of about 20–30 hours. The fibriform cellulose tri-acetate which has formed is treated further in accordance with Example 1.

We may, however, also pretreat the linters in the autoclave itself. To this end we may add 200–300 parts acetic acid saturated at 0–5° C. with sulfur dioxide and, while vigorously mixing, allow the temperature to rise to about 20–25° C. within 10–20 hours. This will cause pressure to arise in the autoclave unless sulfur dioxide in excess is allowed to escape. When operating in this manner, the cotton linters thus pretreated are not centrifuged but directly subjected to acetylation in the same vessel.

*Example 5*

100 parts cotton are introduced into nitric acid of 75% and after the lapse of 3 hours are centrifuged, carefully washed to remove all the acid, boiled repeatedly and thereafter dried. 100 parts of this slightly nitrated cellulose containing about 3% nitrogen are first pretreated during 2 hours with acetic acid as described with reference to Example 1 and then acetylated with a mixture of 420 parts acetic anhydrid (90–92%), 420 parts cyclohexanol acetate, 420 parts ligroin (boiling between 45–85° C.) and 450 parts $SO_2$. 2–3 parts sodium perchlorate and 2–5 parts phosphoric acid (96%) are added to act as catalysts. During the reaction the temperature should not rise above 30° C. To this end part of the sulfur dioxide is allowed to evaporate as described in the specification of U. S. Patent No. 1,910,176. In proportion to the quantity of catalyst used the acetylation has come to an end after 4–10 hours, the esterification product being now soluble in a mixture of 9 parts by volume methylene chloride and one part alcohol. According to whether the solutions shall be more or less highly viscous, the reaction is stopped sooner or later. The fibriform product containing nitrogen is now freed from liquid by pressing, thereafter washed with a mixture of equal parts cyclohexanol acetate and ligroin, thereafter with water, boiled with water and dried.

*Example 6*

100 parts cotton linters are placed during 4 hours at room temperature into 1000 parts formic acid and, after having been centrifuged, are subjected to acetylation under the conditions set out in Example 1, with a mixture of 420 parts acetic anhydrid of 91%, 840 parts benzene, 500 parts sulfur dioxide and 0.7 part perchloric acid of 70%. After the lapse of 12 hours the reaction has come to an end and the product is treated further as described with reference to Example 1.

The fibriform product has similar dissolving properties as the pure cellulose tri-acetates, it shows, however, a total acid content of 63.1% (calculated for acetic acid) and a low content of formic acid.

Example 7

100 parts cellulose containing 8% water are well mixed with 1500 parts propionic acid and the mixture is allowed to stand 4 hours at 70° C., whereupon the material is centrifuged and treated with a mixture composed of 500 parts propionic acid anhydrid (boiling at 166–168° C.), 210 parts benzene, 630 parts ligroin (boiling at 65–95° C.), 440 parts sulfur dioxide and 0.7 part perchloric acid (70%). To prevent the temperature from unduly rising, part of the sulfur dioxide is allowed to evaporate during the reaction. After the lapse of about 7 hours the perchloric acid is neutralized with sodium acetate and the reaction mixture diluted with great quantities of ligroin. The product is freed from the liquid by pressing, washed repeatedly with ligroine, thereafter with water and dried. The product thus obtained has a content of propionic acid of 67.3% and thus corresponds to a cellulose tri-proprionate. It is soluble in a mixture of methylene chloride and alcohol, in acetone and in glacial acetic acid.

Example 8

100 parts cotton linters pretreated as described with reference to Example 1, are subjected to esterification with a mixture composed of 420 parts acetic anhydrid (92%), 840 parts benzene, 100 parts butyric acid and 425 parts sulfur dioxide, catalysts being added as in Example 1. These catalysts may, however, also be added partly or as a whole to the pretreating liquid. During the reaction part of the sulfur dioxide is allowed to escape, the final product is treated further in accordance with Example 1.

The cellulose acetates thus obtained contain about 2–3% butyric acid and display dissolving properties similar to those of the pure cellulose tri-acetates.

These products are absolutely stable. By interrupting the reaction sooner or later it is possible to obtain cellulose esters which, when dissolved in the same solvents for the same concentration, yield solutions of higher or lower viscosity. By the partial esterification with butyric acid, the elongation of films or threads is increased by about 20%, the bending coefficient by about 100%, as compared with the products obtained from pure cellulose acetates of the same viscosity, while the tensile strength is substantially the same; that is the tensile strength when in the form of a film with a width of 15 mms. and a thickness of 0.1 mm. is about 18 kgs., the elongation is about 20 per cent and the bending coefficient ranges from about 360 to 400.

If more butyric acid, for instance 300 parts instead of 100, are added, the final products will contain about 6–10% butyric acid. In order to preserve in this case the fibrous structure of the starting material, the 840 parts benzene may be replaced by a mixture of 420 parts benzene and 420 parts ligroin (boiling at 65–93° C.).

Example 9

100 parts cotton are pretreated with 1000 parts acetic acid as explained with reference to Example 1. The acetic acid still adhering to the cotton is displaced by isovaleric acid, whereupon the material is once more subjected to centrifugation. It is now well mixed with a mixture composed of 500 parts isovaleric anhydrid, 250 parts isovaleric acid, 1000 parts benzene (which acts as diluting agent), 640 parts sulfur dioxide and 1 part perchloric acid (70%) a temperature of about 20° C. being maintained. When the reaction mass has been converted into a homogeneous solution, which is the case after about 3 hours, the perchloric acid is neutralized with sodium acetate and the cellulose isovalerianate which has formed is precipitated by introducing the solution under stirring into ligroin. By careful washing with ligroin and thereafter with water the product is freed from the adhering acid. It dissolves in a mixture of methylene chloride and alcohol and in acetone.

Example 10

100 parts cotton pretreated as described with reference to Example 1 are subjected to esterification under the conditions described in Example 1, with a mixture composed of 420 parts acetic anhydrid (90%), 50 parts isovaleric anhydrid, 840 parts benzene, 430 parts sulfur dioxide and 0.7 part perchloric acid of 70%. After the lapse of about 10 hours a fibriform cellulose acetate containing about 1.5% isovaleric acid is obtained.

The perchloric acid may also be replaced by one of its salts, to which may be added another acid, as described for instance in Example 1.

A fibriform cellulose acetate containing about 16–17% isovaleric acid can be obtained by using for the acetylation a mixture composed of 210 parts acetic anhydrid (90%), 210 parts isovaleric anhydrid, 420 parts benzene, 420 parts ligroin (boiling point 65–93° C.) and 430 parts sulfur dioxide.

Corresponding to their contents of valeric acid, films, threads, etc. prepared from such mixed esters display, as compared with pure tri-acetates, an increased elongation and bending strength. Their tensile strength decreases in proportion to the increasing contents of isovaleric acid.

Similar conditions prevail in the case where the isovaleric acid is replaced by other lower membered fatty acids with more than two carbon atoms.

Example 11

100 parts cotton linters are subjected to a preliminary treatment in accordance with Example 1 and to esterification according to Example 8, the 100 parts butyric acid being however replaced by 130 parts phenol-acetic acid. After the lapse of 10 hours the esterification has come to an end. The fibriform product obtained, when treated further in accordance with Example 1, corresponds, as regards its dissolution capacities, to pure tri-acetate, but contains besides acetic acid also phenol acetic acid linked to the cellulose molecule.

Various changes may be made in the details disclosed in the foregoing specification without departing from the invention or sacrificing the advantages thereof.

We claim:—

1. In the manufacture of cellulose esters of organic acids, the process which comprises reacting upon a cellulose material, of the group consisting of cellulose and the derivatives of cellulose having free and available hydroxyl groups, with an organic acylating agent in the presence of a substantial amount of added sulfur dioxide and of a small amount of a catalyst selected from a group consisting of perchloric acid and its salts, while maintaining a uniform temperature in the reacting zone not substantially exceeding 50° C.

2. The process of claim 1 wherein the catalyst is perchloric acid.

3. The process of claim 1 wherein the catalyst is a salt of perchloric acid.

4. The process of claim 1 wherein the catalyst is a salt of perchloric acid and wherein a mineral acid is also added to the reaction mixture.

5. The process of claim 1 wherein the quantity of SO₂ employed is at least equal in weight to said cellulose material.

6. The process of claim 1 wherein the quantity of SO₂ employed is at least sufficient to saturate the acylating mixture.

7. The process of claim 1 wherein the reacting mixture contains a low membered fatty acid and wherein the acylating agent is the anhydride of a different organic acid.

8. The process of claim 1 wherein the cellulosic material is pretreated by contacting it with a low membered fatty acid in the presence of SO₂.

9. The process of claim 1 wherein the cellulosic material is pretreated by partially esterifying the same by means of an acid.

10. In the manufacture of fibrous esters of organic acids, the process which comprises reacting upon a cellulosic material, of the group consisting of cellulose and the derivatives of cellulose having free and available hydroxyl groups, with an organic acylating agent in the presence of a substantial amount of added sulfur dioxide, of a substance capable of preventing solution of the ester, and of a small amount of a catalyst selected from a group consisting of perchloric acid and its salts, while maintaining a uniform temperature in the reaction zone not substantially exceeding 50° C.

11. The process of claim 10 wherein the substance preventing solution of the ester is a liquid hydrocarbon selected from a group consisting of benzene, toluene, xylene, petrol, and ligroin.

12. As a new product, a shaped article of primary cellulose acetate being soluble in methylene chloride but insoluble in acetone and cold glacial acetic acid and remaining insoluble in acetone even when treated with dilute acids, being stable to temperatures ranging from about 250 to 270° C. and when in the form of a film 15 mms. in width and 0.1 mm. in thickness with a width of 15 mms. having a tensile strength of at least 18 kgs. an elongation of at least 18 per cent and a bending coefficient ranging from about 180 to 200, the said product being made by acetylating cellulose or the derivatives of cellulose having free and available hydroxyl groups in the presence of a substantial amount of added sulfur dioxide and a small amount of a catalyst selected from the group consisting of perchloric acid and its salts.

13. In the manufacture of mixed cellulose esters of organic acids, the process which comprises reacting upon a cellulosic material, of the group consisting of cellulose and the derivatives of cellulose having free and available hydroxyl groups, with acetylating and butyrylating agents in the presence of a substantial amount of added sulfur dioxide and a small amount of a catalyst selected from a group consisting of perchloric acid and its salts, while maintaining a uniform temperature in the reaction zone not substantially exceeding 50° C., and recovering the primary esterification product thereby produced.

14. In the manufacture of cellulose esters of organic acids, the process which comprises reacting 100 parts of cellulose with sufficient organic acylating agent to acylate the same, in the presence of a perchloric catalyst in amount equivalent to from about 0.4 to 1 part perchloric acid; sufficient SO₂ being added to the reaction mixture to substantially saturate the same at ordinary temperatures, the temperature of the reaction being maintained below about 50° C. and the reaction being continued until a primary acylation product is formed.

15. The process of claim 14 wherein an inert organic diluent is present in the reaction zone in amount sufficient to prevent solution of the primary acylation product.

16. As a new product, a primary ester of cellulose having some of the fibrous structure of the natural cellulosic material from which it was prepared, being soluble in methylene chloride, being stable to temperatures ranging from about 250° to 270° C. and, when directly converted into the form of a film having a width of 15 mms. and a thickness of 0.1 mm. without previous hydrolytic treatment, having a tensile strength of at least 18 kgs. an elongation of at least 18 per cent and a bending coefficient ranging from about 180 to 200, the said product being made by the process of claim 10.

17. As a new product, a cellulose tri-ester soluble in methylene chloride consisting substantially of cellulose tri-acetate containing a small proportion of cellulose tri-butyrate, producing highly viscous but still limpid solutions, being stable to temperatures ranging from about 250 to 270° C. and when in film form with a width of 15 mms. and a thickness of 0.1 mm. having a tensile strength of about 18 kgs. an elongation of about 20 per cent and a bending coefficient ranging from about 360 to 400, the said product being made by the process of claim 13.

18. The process of claim 1 wherein the cellulosic material is pretreated by contacting it with a low membered fatty acid in the presence of SO₂ and a small amount of said catalyst.

RICHARD MÜLLER.
MARTIN SCHENCK.
WILHELM WIRBATZ.